United States Patent [19]

Roper et al.

[11] Patent Number: 5,630,184
[45] Date of Patent: May 13, 1997

[54] METHOD OF DELETING AND ADDING NODES IN A SPANNING TREE NETWORK BY COLLATING REPLIES FROM OTHER NODES

[75] Inventors: Michael I. Roper, Chandlers Ford; Graham D. Wallis, Southampton, both of Great Britain

[73] Assignee: International Business Machines Corporation, Armonk, N.Y.

[21] Appl. No.: 135,713

[22] Filed: Oct. 13, 1993

[30] Foreign Application Priority Data

Nov. 7, 1992 [GB] United Kingdom .................. 9223389

[51] Int. Cl.$^6$ .................................................. G06F 15/16
[52] U.S. Cl. .................... 395/200.1; 395/200.04; 395/200.12
[58] Field of Search ................ 395/200.02, 200.04, 395/200.1, 200.16; 364/516, 514 C

[56] References Cited

U.S. PATENT DOCUMENTS 5,355,371  10/1994  Auerbach et al. .................... 370/60
5,437,046   7/1995  Bright et al. ......................... 395/800

OTHER PUBLICATIONS

Adrian Segall et al. "Reliable Multiuser Tree Setup with Local Identifiers", IEEE Journal on Selected Areas in Comm., vol. 9 No. 9 Dec. 1991.
Adrian Segall et al. "Route Setup with Local Identifiers", IEEE Transactions on Comm., vol. COM34 No. 1 Jan. 1986.
Gopal et al. "Directories for networks with casually connected users" IEEE Infocom '88, pp. 1060–1064 1988.

Primary Examiner—Thomas C. Lee
Assistant Examiner—D. Dinh
Attorney, Agent, or Firm—Joscelyn G. Cockburn

[57] ABSTRACT

A computer forms a node in a network, consisting of computer nodes linked together into a minimum spanning tree topology. When a computer receives a message from a first node linked to it, it forwards the message to other nodes linked to that computer, as well as storing information about the message. As replies are received from the other computers, they are stored and collated together, to allow the computer to send just a single reply message back to the originating node based on the collated replies. This single reply is in turn collated at the next node. The message requests deletion of a particular node from the network. No node deletes the node from the network until replies have been received from all the nodes to which the message was forwarded.

11 Claims, 3 Drawing Sheets

METHOD OF DELETING AND ADDING NODES IN A SPANNING TREE NETWORK BY COLLATING REPLIES FROM OTHER NODES

BACKGROUND OF THE INVENTION

The present invention relates to a method of operating a computer forming a node in a network, the network consisting of a plurality of computer nodes linked together.

Over the past few years it has become increasingly common to connect personal computers or workstations together into networks so that different machines can communicate with one another. A typical approach has been the introduction of local area networks (LANs) that provide file transfer and other facilities between computers. Other types of link, for example Intergrated Services Digital Network (ISDN), are also known. Such networks offer the possibility of new forms of application for the user—for example EPA 475581 describes a collaborative working environment in which users at two or more different machines work simultaneously and in combination on a single program (for example a spreadsheet). Another possibility is to provide video-conferencing, using personal computers equipped with multimedia video display adapter cards.

In order to achieve maximum flexibility and usefulness, such collaborative working and multimedia applications place great demands on the communications subsystem used. Likewise, the network must be able to use more than one physical network—for instance, workstations on a LAN in one location can be connected with another LAN over an ISDN line (note that we are using "network" here by itself to imply a logical collection of nodes communicating with one another, rather than a hardwired physical network).

The provision of such a network environment poses many technical problems, such as how to assign a terminal a unique name, so that other terminals in the network can identify it. Because the network can be heterogeneous (based on more than one type of physical connection and computer), it is not possible to use identifiers based on particular hardware systems (eg a telephone number as in ISDN, or LAN card identifiers as in a LAN). U.S. Pat. No. 4,914,571 describes a method for locating a named resource in a network. This technique can be adapted to obtain an identifier. The resource requested can represent the intended identifier: if no node in the network has knowledge of this resource, then the identifier must be available, if not, then a new identifier must be selected.

However, U.S. Pat. No. 4,914,571 does not address other difficulties arising from the dynamic nature of the network, such as the need for mechanisms whereby terminals can join or depart from the network in an orderly fashion. Of course, the network must also be able to handle the situation in which links or terminals in the network go down, effectively splitting the network.

Accordingly, the invention provides a method of operating a computer forming a node in a network, said network consisting of a plurality of nodes linked together in a minimum spanning tree topology, wherein each node maintains information concerning the configuration of the network, the method comprising the steps of:

receiving a message from a first node linked to said computer commanding the computer to delete a specified node from the network;

storing information identifying the message;

forwarding the message to other nodes linked to said computer;

receiving replies to the message from said other nodes;

collating the replies received from said other nodes with the stored information to generate a single reply, and dependent on the contents of said replies, deleting the specified node from the network by updating the configuration information;

sending the single reply to said first node.

The advantage of such an approach is that if the message requests deletion of a node, and the normal action would be for the computer to prevent further communications with that node (typically by updating its configuration table), that action is delayed until a full set of positive replies has been received. This ensures that if a node sends a negative response because it is still exchanging messages with the node to be deleted, then the computer still knows how to process these messages.

Thus if a link is broken, resulting in part of the network being cut off, then effectively the network has been reconfigured to no longer include the portion that has been cut off (which may of course form a network on its own). Once a node detects that a portion of the network attached to it has been cut off, then it searches to see if there are any messages awaiting replies from that portion of the network. Any outstanding replies are provided by that node itself, depending on the nature of the message concerned.

The invention also provides a computer workstation adapted to form a node in a network, said network consisting of a plurality of nodes linked together in a minimum spanning tree topology, wherein each node maintains information concerning the configuration of the network, the workstation comprising:

means for receiving a message from a first node linked to said computer commanding the computer to delete a specified node from the network;

means for storing information identifying the message;

means for forwarding the message to other nodes linked to said computer;

means for receiving replies to the message from said other nodes;

means for collating the replies received from said other nodes with the stored information to generate a single reply, and dependent on the contents of said replies, deleting the specified node from the network by updating the configuration information;

means for sending the single reply to said first node.

BRIEF DESCRIPTION OF THE DRAWINGS

An embodiment of the invention will now be described by way of example with reference to the following drawings.

DESCRIPTION OF THE PREFERRED EMBODIMENT

Figure 1:
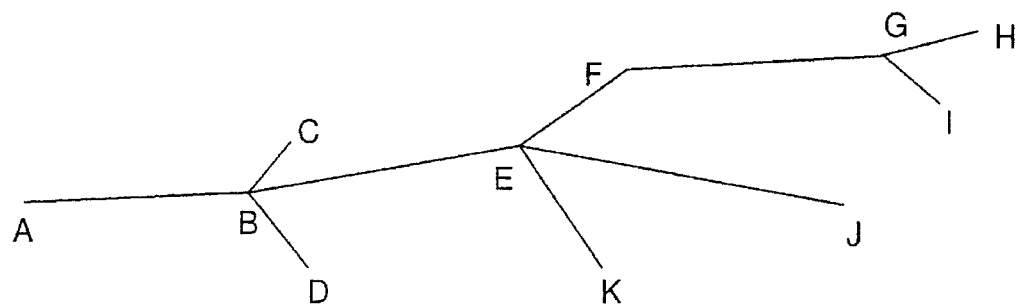
FIG. 1 illustrates a network having a minimum spanning tree topology.

FIG. 1 shows a set of workstations (A, B, C . . . K) joined together into a computer network. The pattern of links shown is known as a "minimum spanning tree". Such a network is characterised by the absence of any closed loops, so that there is one and only one route between any two nodes. The use of a minimum spanning tree avoids the need for any complicated routing algorithms (see Computer Networks by AS Tanenbsaum, 1988, Prentice-Hall, for a further discussion of network configurations and properties).

Of particular relevance is the situation where the links in the network of FIG. 1 are not all of the same type. For example, links B-E, E-F and F-G might be over ISDN transmission lines, whilst A-B, B-C and B-D might be part of one LAN, E-J and E-K part of another LAN, and G-H and G-I part of a third LAN. These links, even if nominally of the same type of members of the same LAN, may have different bandwidths and different volumes of traffic on them, resulting in differences in transmission performance. Many other types of link, such as X.25, may also be connected into the network (note that "network" is used here to denote a logical collection of linked nodes, rather than a set of physically connected terminals).

Figure 2:
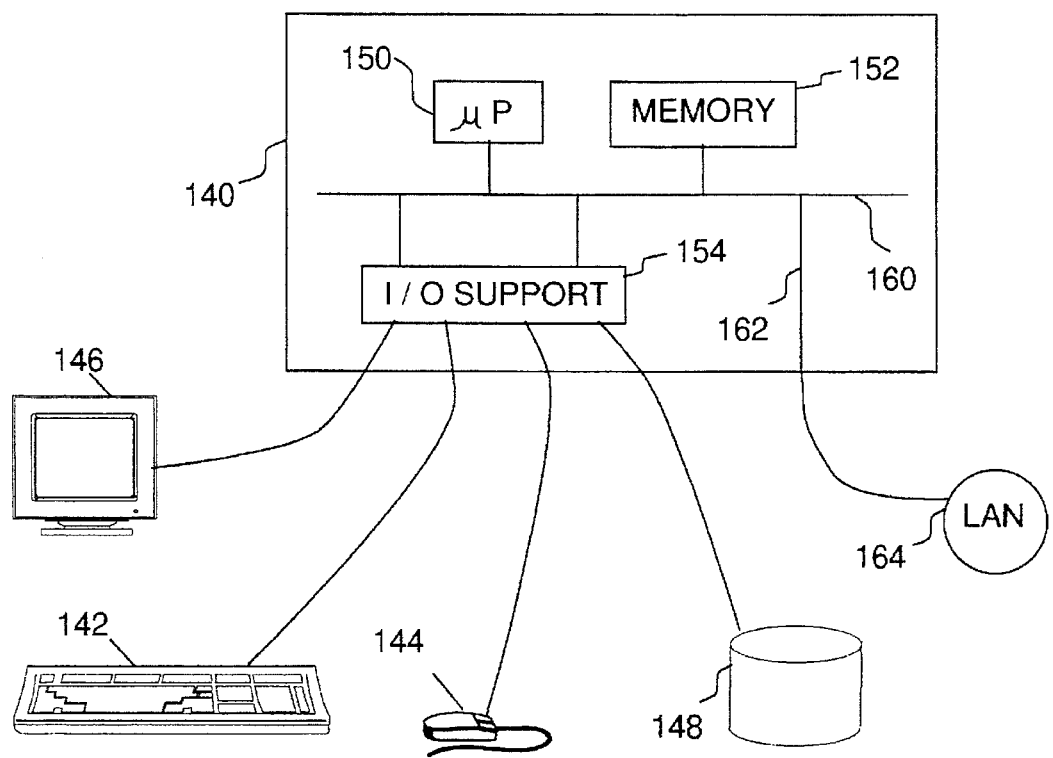
FIG. 2 is a simplified schematic diagram of a typical computer workstation for connection into a network.

A highly simplified schematic diagram of a conventional computer workstation is shown in FIG. 2, such as may form a typical node in the network of FIG. 1. The workstation includes a system unit 140, keyboard 142 and mouse 144 for input, a computer screen for display 146, and a hard disk drive 148 for data storage. The system unit includes a bus 160 to which are connected the central microprocessor 150 which controls the workstation, semi-conductor memory (ROM/RAM) 152, and IO support devices 154 for the keyboard, display, etc. Also included in the system unit is an adapter card 162 containing appropriate hardware and software to allow the workstation to be attached to a local area network (LAN) 164. The computer workstation may also include additional adapter cards (not shown) to support other modes of communication, such as ISDN. The computer workstation of FIG. 2 may for example be an IBM PS/2 computer fitted with a Token Ring adapter card (also available from IBM).

Figure 3:
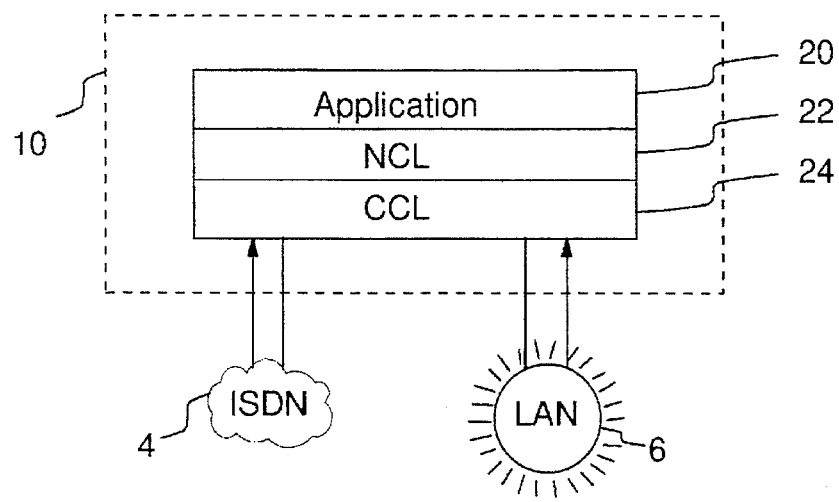
FIG. 3 is a schematic diagram of the processing layers of the computer workstation of FIG. 2.

FIG. 3 depicts the three main processing layers in the workstation of FIG. 2: an application 20, a network control layer 22 (NCL) and a common communications layer 24 (CCL). The application, which is typically what the user actually sees, is responsible for initially requesting connection into the network, generating the data to be transmitted to other terminals, and processing received data. The NCL, which is most important for present purposes, is responsible for managing the network as a logical entity—i.e. for maintaining records of which nodes are connected into the network, and so on. The CCL (in very simplified terms) controls the physical interaction with the network. Thus a message is passed from the application through the NCL to the CCL for sending to another terminal. The CCL splits the message into segments or data buffers, adds address information, and so on, in preparation for actual transmission.

A multi-point network, providing guaranteed, sequenced delivery of data buffers must be formed from the set of point-to-point communications links shown in FIG. 1. This capability must be provided over heterogeneous underlying communications links, and must permit dynamic reconfiguration of the network, in the absence of any unified universal addressing scheme. This support must have minimum impact on network performance.

Thus each node in the network must be capable of connecting to a number of other nodes, which in turn can connect to further nodes, and together comprise a network.

This network must be capable of delivering data buffers to their destinations in a guaranteed manner (as opposed to an unreliable communications scheme, in which the user of the service has to expect some degree of failed delivery and retry where necessary). It must also deliver buffers in the same order that they are submitted by the user for transmission (note that the network provides the user with the capability to multiplex a number of streams of data onto a single communications link: the network will provide sequenced delivery within each of those multiplexed streams, but will not necessarily adhere to the original sequence of the overall multiplexed datastream). Therefore the network must provide its own unique addressing scheme, and support "on-the-fly" addition/deletion of nodes in the network, without jeopardising the above stated objective of providing guaranteed, sequenced delivery of data.

In order to meet the above requirements, the communications protocol of Tables 1–5 has been developed. This is a set of predetermined control messages that can be exchanged between nodes at the NCL level to provide network control. The protocol comprises a number of protocol data units (PDUs) which are named following conventional practice, such that any PDU which requests an action of a node is termed a REQUEST, and the response to a request is termed a RESPONSE. An unsolicited PDU is termed an INDICATION, and advises of the occurrence of an event, or of data in the network. Some indications have confirmatory PDUs, and these are termed CONFIRMATIONS. The purpose of some PDUs is fairly clear, whilst others deal with apects of the protocol which will be explained in more details below.

Figure 4:
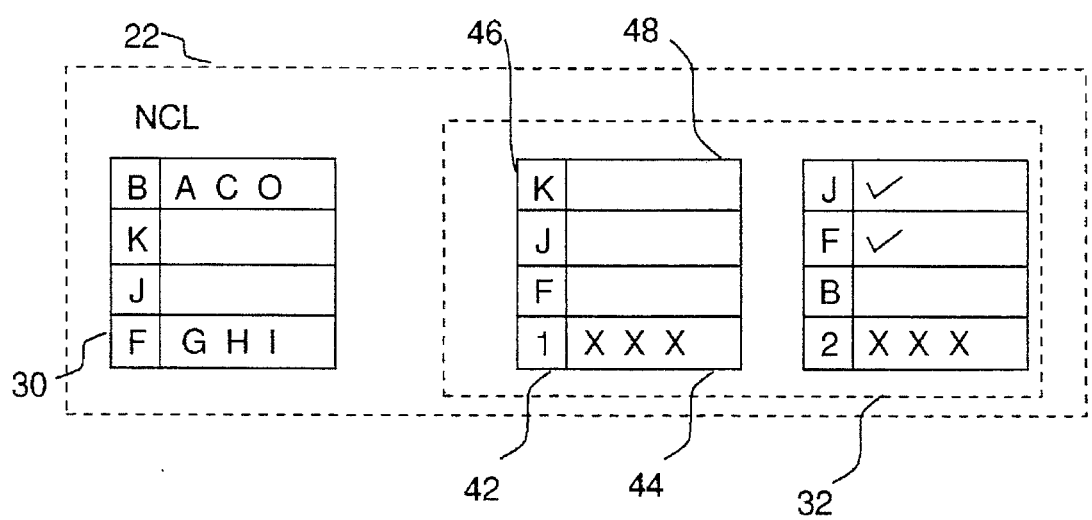
FIG. 4 shows information stored in one of the processing layers of FIG. 3.

FIG. 4 depicts the information stored by the NCL 22 for node E in the network of FIG. 1. The NCL maintains two tables 30, 32, the first of which (the "routing table" 30) contains E's knowledge of the network structure. This table lists the nodes that are directly connected to E (ie B, K, J, and F). Associated with each of these directly linked nodes, is a set of dependent nodes—ie the ones that are connected to E via that particular directly linked nodes. Thus if E desires to transmit a message to I, it knows that I can be reached through F and so would send the message to F. Node F would also store a routing table, containing E and G as the directly linked nodes, with (A, B, C, D, E, J, K) and (H, I) as the two respective sets of dependent nodes. In this case, F would determine to forward the message to G, which in turn would send the message to I, the final destination. Whenever a new node joins the network, a NCL_IND_MEM_INFO message is propagated around the network, so that each node can update its routing table. A similar process occurs on deletion of a node from the network.

The network is restricted to a minimum spanning tree, to avoid the need for an advanced routing algorithm to cope with multiple-delivery paths. This also simplifies the network with regard to response monitoring. Since the response from any node has only one route it can take through the network to get to the originator of the associated request, it is clear that the response will re-trace the route taken by the request (given that the topology does not change in the intervening period, which is ensured by the directional reaction strategy described below). This facilitates the use of a simple method for handling the responses from multi-cast requests. A node which has multi-cast a request will wait for responses from each of the links on which the request was cast, and only when all links have responded does it build a response which it passes back to the node from which it received the original request. This process is termed "collation". The status of the response that the collating node generates will be the worst-case status of the combined responses that it has collated.

This is accomplished using the second table of FIG. 4, termed the "collation table" 32. This table contains all the messages that have passed through that node and await reply (response or confirmation). Each message contains information 42, 44 identifying the message, as well as other information, e.g. concerning the originating node (or at least the node which forwarded the message to E) and the data stream being used (a data stream is a logical channel between two nodes). Also stored for each message is a list 46 of nodes that the message was sent to, along with the replies 48 (if any) for the respective nodes. Thus for message 1, which was presumably received from node B, replies are awaited from nodes F, J, and K (note that the response of F will be a collation of the responses from F, G, H and I). For message 2, which was presumably generated by node K, replies have been received and logged from nodes J and F, with only a reply from node B outstanding. Once all the replies for a particular messages have been collated together, the NCL can generate a single overall reply for that branch of the network, transmit the reply, and delete the message from the table.

An important feature of the network is the ability to be able to handle the lack of a reply. There are two reasons why a node issuing or relaying a request/indication may fail to receive a response/confirmation. One is that a node elsewhere in the network has 'hung', and the other is that a link has become disconnected. In the former case, the operation times out at the node which originated the request/indication (timeout can either be manual or automatic). In the latter case the NCL automatically handles response/confirmation generation. If a link in the network is broken, then each node adjacent to the broken link searches for outstanding requests/indications, and generates appropriate response/ confirmation PDUs which are appropriate to the new topology.

The type of response/confirmation which is considered appropriate in the event of a broken link depends on the nature of the request/indication. In cases where the request is for the use of an identifier (either for a group, member or datastream) then the appropriate response will have a successful status code (indicating that the identifier is available for use), since a node which has been removed from the network by the loss of a link will not be competing for the use of an identifier within the network. Thus in the example of message 2 in FIG. 4, if the link to B was broken, then for an identifier request the NCL will effectively insert an "OK" reply from B. Since the replies from J and F are also "OK", the NCL is now in a position to send an "OK" reply off to K.

For some types of request/indication (eg a message indicating the presence of a new node) the nature of response/ confirmation is not significant. Knowledge that the response/ confirmation has arrived (or not arrived due to link failure) is enough information to satisfy the request/indication, which may be merely waiting for notification that all nodes in the group have received the request/indication before allowing further actions to be performed (a network wide synchronisation). The loss of a link in this situation is effectively clearance that it is safe to proceed, and so again an appropriate reply can be generated. Finally, there are types of request for which a link failure represents a failure of the Request operation, and the node will then construct a negative Response to return to the originator.

Thus whenever it is detected that a link has gone down, such as the link B-E in FIG. 1, each adjacent node (B and E in this case) will search their collation tables for messages for which a reply from the now unavailable node is still outstanding. Dependent on the type of message, an appropriate response for the now disconnected branch of the network will be inserted, thereby allowing a reply to be generated in due course in accordance with the normal procedure.

The above process is aided by the fact that the NCL is split into two distinct logical layers. The lower layer is merely concerned with maintaining the network, including data routing, response collation and handling link severance (as described above). The higher of the two conceptual layers is concerned with taking actions on behalf of the network user, and makes requests of the lower layer. Since the originator of a request/indication will be in the higher functional layer of a node, the position (topologically) of the originator in the network has no bearing on the action taken by the lower functional layer when dealing with a link disconnection. The originating entity could be situated at a node which is handling the link disconnection, or may be located elsewhere. The originator is merely waiting for responses or confirmations to the messages that it sent out and is not affected by the fact that the replies it receives are generated by a proxy node on behalf of a disconnected node. Neither is it affected by the fact that the proxy node may be the lower layer of the node at which it is itself situated.

As an example of the above process in action, consider the generation of a network addressing scheme. The use of heterogeneous networks precludes the availability of a universal predetermined addressing scheme by which individual nodes and the obects which they create can be unambiguously identified. Thus it is important to be able to dynamically generate unique, shared (ie known throughout the network) identifiers or correlators, and overcomes the inherent race conditions which would otherwise allow two (or more) computers be assigned the same identifier.

The first problem to face is that since nodes may take part in a number of networks (simultaneously) they must be able to unambiguously identify a particular network. The common approach of simply exchanging correlators between a pair of nodes is not appropriate due to the multi-cast nature of the networks, which may be supporting an arbitrarily large number of nodes (limited only by performance and implementation details such as word-length). A network is identified by a common identifier known as the group_id. All nodes use the same group_id to identify a network. The group_id is easy to establish since the originator of the group (i.e. first node in the network) simply selects a group_id (either sequentially or randomly) and that group_ id is adopted by all nodes that are added to the network. Collisions can occur when a node is added to a network with the group_id as a network the node is already part of. In this case, the group_id of the network to which the node is being added must be changed, as described below.

Once the network is uniquely identified, a scheme is needed for identifying the nodes within the network (termed "a member identifier"). Each node is therefore assigned a network-unique identifer by the (existing) node which adds it to the network. An existing node therefore must have some means of generating an identifier which is unique within the network. One possibility would be to chain identifiers in a hierarchy, but this could lead to identifiers becoming arbitrarily long. Thus an arbitration scheme is used to create a non-hierarchical identifier set.

Each existing node ensures that the identifier it selects for a new node is network-unique by sending a NCL_REQ_

MEM_ID PDU to all other nodes on the network, which queries whether the identifier is currently in use. At each node at which the request is received, the identifier, if available, is reserved on behalf of the requester, and the request is passed on along the network. If at any node the identifier is already reserved or used, the request is not passed on, and instead a negative response is returned along the branch that the request arrived on.

If a request reaches a leaf-node of the network (ie a node connected to only one other node—terminals A, C, D, K, J, I and H in FIG. 1) and the identifier is available at the leaf-node, it is reserved on behalf of the requester. The leaf-node then returns a positive Response, which flows back along the branch of the network. Nodes which support multiple branches perform response collation as described above. Should any node receive a negative response, it passes a negative response back towards the requester. The requester waits until it has received positive responses from all branches on which it sent the request, and can then commit the identifier in the knowledge that no other node will use it to identify a different object. If the requester receives any negative response, it releases the identifier and sends another request with a different identifier. The original identifier is released by the sending of an NCL_REL_MEM_ID PDU. Explicit release is necessary if a Requester is to be allowed to have more than one request active at a time. Alternatively, a new request by a requester could be allowed to implicitly release any identifier previously reserved on its behalf.

If we assume that message 2 in FIG. 4 depicts an NCL_REQ_MEM_ID PDU, and that the link with B is now broken, then it is acceptable for E to respond positively (assuming that J, F and E itself are likewise positive), since B and its associated branch are no longer part of the network. Clearly if the link is re-established, then the process for adding new nodes to the network must be adopted in order to add B and its associated branch back into the network. This ensures that any conflicting identifiers that might have been adopted are detected and resolved.

Following the establishment of a unique addressing scheme for the nodes within the network, it is straightforward to provide a means of identifying the transactions which are sent on the network. One possible scheme is for each node to maintain a (sequential) set of identifiers which are unique at that node, and for transactions to be identified by compounding the network-unique node identifier with node-unique transaction identifier, to provide a network-unique transaction identifier.

Note that one possible alteration to the above scheme would be for collating node to generate a reply as soon as it had sufficient information. Thus for example, if the collating node receives a message to indicate that a identifier is unavailable, it could send a negative response immediately, without waiting for the replies from other nodes (since these could not affect its final reply). Another possible modification would be if a link goes down to examine replies already received from that node which are awaiting collation, to see if they are still valid.

Given that the network contains a number of independent nodes, and that alterations to topology and datastreams take place "on the fly" for maximum performance, situations will arise in which different nodes are contending for a resource (e.g. trying to request the same identifier). There has to be a means of both detecting and recovering from such conflicts. Detection is straightforward, since the resource can be easily shown to be in use (or reserved) at any particular node. Recovery is achieved by using a pre-arranged back-off strategy. This strategy is based on the prevalence of one request, over and above any conflicting request/s. The decision as to which request prevails is simply based on member_id, since that is network-unique. The node with the lower member_id is allowed to prevail. Depending on details of the implementation, this may have the effect of allowing the longest standing node to succeed, whilst more recently added nodes must back-off and retry. This unambiguous way of determining which node should prevail prevents unnecessary back-off by one of the nodes. Clearly once prevalence has been determined, the unsuccessful nodes must be able to reverse any changes they have made to the state of the network—e.g. release reserved identifiers, or in the case of a group_id collision, arbitrate for a new group_id which is then used to replace the one currently in use.

One very important aspect of the communications protocol is the adoption of a directional reaction strategy. Some actions (e.g. set up of a datastream) must flow out from the initiating node, so that resource is established as the action flows through the network. This ensures that as nodes become aware of the datastream, resource has been allocated for it, and it is functional at between any nodes which are aware of it. Other actions which make use of the "outward" reaction strategy are requests for use of identifiers, as described above. There are other actions however for which an "inward" reaction strategy is required. These include operations such as deletion of a node, which must never construct a situation in which non-adjacent nodes that have not yet implemented the deletion of a node from their topology information are separated by one or more nodes which have already deleted the node from their view of the network.

Thus for example, supposing that B sends out a message (NCL_REQ_MEM_DELETE) indicating that D is to be disconnected from the network. It is important that if for example there is a message currently en route to D from H, which has currently progressed as far as G, that nodes E and F do not effectively disconnect D before the message can be delivered. To avoid this situation, each non-leaf node in the network stores the delete message (in a manner analogous to the collation table). When the messages arrive at leaf nodes, these nodes are perform the appropriate steps for disconnecting D from the network. They can then send a response back "inwards" towards B. Each non-leaf node waits until it has received the inward going message from each relevant adjacent node, before performing the disconnection itself, in an exactly analogous manner to the collation described above. This strategy avoids any terminal effectively disconnecting D (eg by deleting D from its routing table) prematurely.

Figure 5:
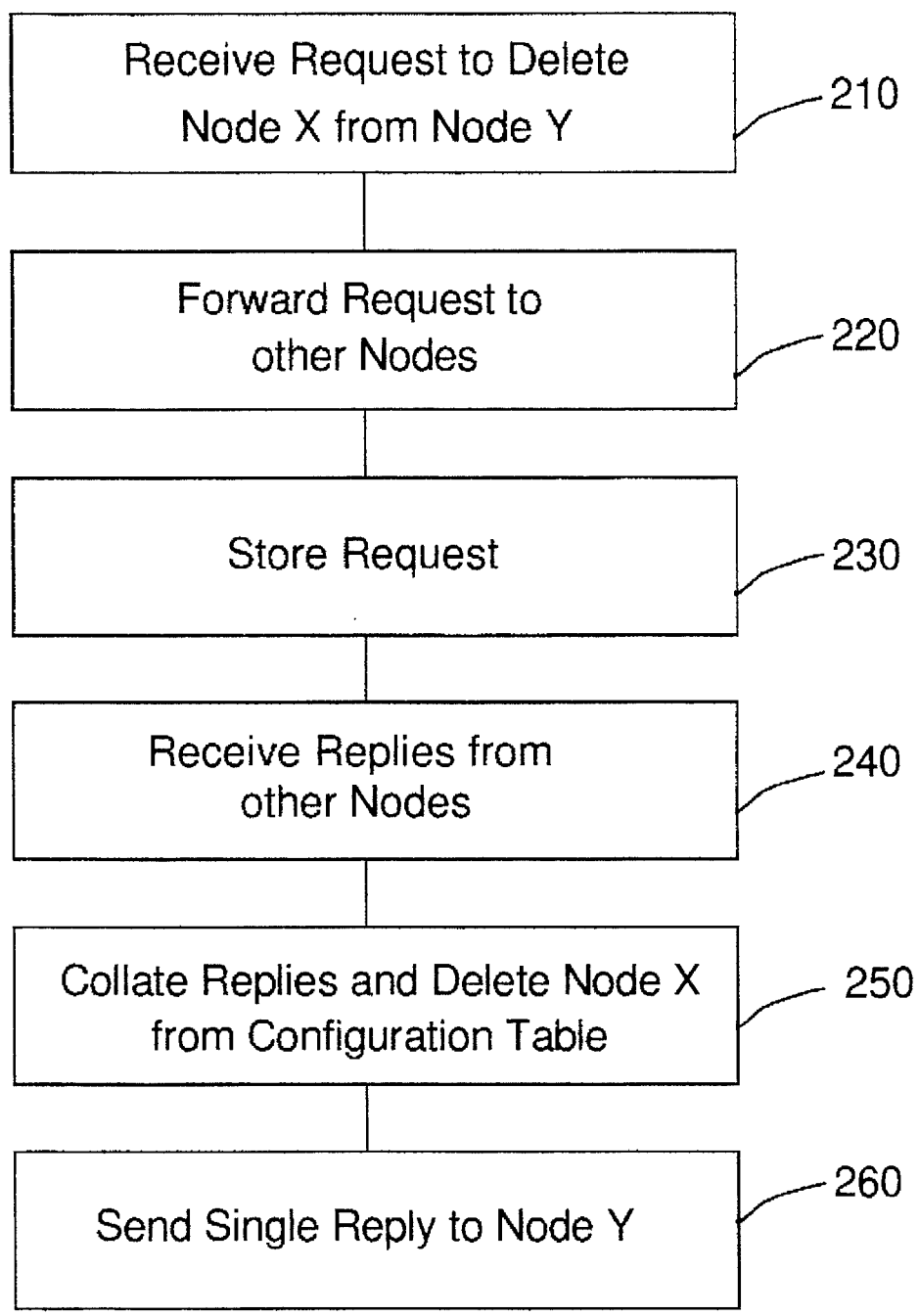
FIG. 5 is a flow chart illustrating the method of the invention.

This procedure is illustrated in the flow chart of FIG. 5. At the initial step 210, a node receives a message from node Y (say) requesting the deletion of another node in the network (node X say). The node forwards this message onto all the other nodes to which it is attached (step 220), barring of course node Y, from which it received the message originally, as well as storing details of the request (step 230). At step 240, the node receives replies from the other nodes to which it forwarded the message. The node collates the replies together (step 250), adding each response as it comes in to the stored details of the request, until a complete answer for that branch of the tree is obtained. Assuming that there are no problems with the deletion (eg that none of the nodes to which the message was forwarded are still in active communication with node X), the node can then update its configuration table to delete node X. The node then returns an appropriate response back to node Y (step 260).

A significant complication relating to the communications protocol occurs if the network provides the user with the ability to prioritise transmitted data within a range of levels, rather than having just a uniform priority. Such a range of priorities allows more time-critical tasks to benefit from superior network throughput time and latency compared with other less critical tasks (e.g. background file transfer). However, if data messages can be assigned different priorities then the order of arrival becomes unpredictable and so a decision needs to be made as to what priority to assign to communications control messages. In fact, the priority at which control information is sent depends on the nature of the action which the control information relates to. Some actions require that the control PDUs be sent at a priority level at least as high as the highest data level, whilst others should be sent at a level no higher than the lowest data level. This is so that controls which are setting up resource of any kind arrive at least as quickly as data traffic which may require the use of that resource, and controls which remove resource will always allow data traffic which may be using the resource to clear the network before the resource is released. Thus for example, if a leaf node sends data to a node, and then sends back a confirm delete message for this node, then the second message must be sent slowly enough so as not to overtake the second.

One final aspect of the communications protocol is the need for a multi-cast flow-control technique to achieve optimal network utilisation. There are two levels of flow-control, which relate to the capacity of the networking layer itself, and the capacity of the underlying point-to-point communications links. Whenever a node is incapable of receiving data traffic due to its capacity being already exhausted, it can send an Ind_Flow_Control_On PDU to its neighbouring nodes to prevent them from transmitting any further data buffers to it. This, however, is not a sufficient strategy, since the exhausted node must be able to still receive similar flow-control indications from its neighbours, since they may too be experiencing similar capacity problems. To ignore such indications could create data loss when one of the nodes is able to resume normal operation. Therefore, a flow-control count is introduced to overcome this problem. A node increments its flow_control_count whenever a neighbour sends an Ind_Flow_Control_On PDU. The node decrements its flow_control_count each time it receives an Ind_Flow_Control_Off PDU. Only when the flow_control count reaches zero can the node resume transmission.

Table 1: Addition of Nodes to a Network

Protocol Data UnitDescription
NCL_REQ_MEM_ADDsent to a new node to request that it joins the network
NCL_RSP_MEM_ADDresponse to the above pdu with status
NCL_IND_MEM_INFOindicates presence of new node
NCL_IND_GRP_DSTREAMSindicate to a new node which data streams are active Table 2: Deletion of Nodes from the Network Protocol Data UnitDescription
NCL_REQ_MEM_DELETErequest deletion of a node
NCL_RSP_MEM_DELETEresponse to above pdu, with status
NCL_IND_MEM_DELETEnotification of imminent node deletion
NCL_CNF_MEM DELETEconfirmation of above pdu
NCL_IND_GRP_ENDindication of forced shutdown of network Table 3: Control of Datastreams Protocol Data UnitDescription
NCL_IND_DSTREAMindication of creation of new stream, or change to node participation in a stream
NCL_IND_DATAnotification of data being transmitted on behalf of a network user
NCL_CNF_DATAacknowledgement of receipt of above pdu (optional)
NCL_IND_FLOW_CONTROL_ONnotification of blockage of network due to high traffic volume
NCL_IND_FLOW_CONTROL_OFFnotification of alleviation of above blockage Table 4: Arbitration of Identifiers Protocol Data UnitDescription
NCL_REQ_GRP_IDreservation of a group identifier
NCL_RSP_GRP_IDresponse to above pdu with status
NCL_IND_GRP_IDnotification of change of group identifier previously reserved by above pdu
NCL_REL_GRP_IDrelease of a group identifier reserved by above process
NCL_REQ_MEM_IDreservation of a member identifier
NCL_RSP_MEM_IDresponse to above pdu with status
NCL REL MEM IDrelease of a member identifier reserved by above process
NCL_REQ_DSTREAM_IDreservation of a datastream identifier
NCL_RSP_DSTREAM_IDresponse to above pdu with status
NCL_REL_DSTREAM_IDrelease of a datastream identifier reserved by above process Table 5: Network Iterrogation Protocol Data UnitDescription
NCL_REQ_MEM_INFOrequest for information about a member

We claim:

1. A method of operating a computer forming a node in a network, said network consisting of a plurality of nodes linked together in a minimum spanning tree topology, wherein the nodes may join or leave the network dynamically, the method comprising the steps of:

maintaining, in each of the nodes, a table containing configuration information of the network;

receiving a message from a first node linked to said computer commanding the computer to delete a specified node from the network;

storing information identifying the message;

forwarding the message to other nodes linked to said computer;

receiving replies to the message from said other nodes;

collating the replies received from said other nodes with the stored information to generate a single reply, and dependent on the contents of said replies, deleting the specified node from the information maintained by the node concerning the configuration of the network; and sending the single reply to said first node.

2. A computer workstation adapted to form a node in a network, said network consisting of a plurality of nodes linked together in a minimum spanning tree topology, the workstation comprising:

a structure which stores configuration information of the network;

a structure for receiving a message from a first node linked to said computer commanding the computer to delete a specified node from the network;

means for storing information identifying the message;

means for forwarding the message to other nodes linked to said computer;

means for receiving replies to the message from said other nodes;

means for collating the replies received from said other nodes with the stored information to generate a single reply, and dependent on the contents of said replies, deleting the specified node from the information maintained by the node concerning the configuration of the network; and means for sending the single reply to said first node.

3. The method of claim 1, further comprising the steps of:

receiving another message from one node linked to said computer inquiring whether an identifier specified in said message is available for allocation to a new node to be joined to the network;

storing information identifying the another message;

forwarding the another message to other nodes linked to said computer;

receiving replies to the another message from said other nodes;

collating the replies received from said other nodes with the stored information to generate a single reply, and dependent on the contents of said replies, indicating whether or not said identifier is available; and sending the single reply to said one node.

4. A method of operating a computer forming a node in a network, said network consisting of a plurality of nodes linked together in a minimum spanning tree topology, wherein the nodes may join or leave the network dynamically, the method comprising the steps of:

receiving a message from a first node linked to said computer inquiring whether an identifier specified in said message is available for allocation to a new node to be joined to the network;

storing information identifying the message;

forwarding the message to other nodes linked to said computer;

receiving replies to the message from said other nodes;

collating the replies received from said other nodes with the stored information to generate a single reply, and dependent on the contents of said replies, indicating whether or not said identifier is available; and sending the single reply to said first node.

5. The method set forth in claim 1 further including the steps of:

receiving another message from one node linked to said computer commanding the computer to add a specified node to the network;

storing information identifying the another message;

forwarding the another message to other nodes linked to said computer;

receiving replies to the another message from said other nodes;

collating the replies received from said other nodes with the stored information to generate a single node add reply, and dependent on the contents of said replies, adding the specified node to the information maintained by the node concerning the configuration of the network.

6. A method of operating a computer forming a node in a network, said network consisting of a plurality of nodes linked together in a minimum spanning tree topology, wherein the nodes may join or leave the network dynamically, the method comprising the steps of:

maintaining, in each of the nodes, a table containing configuration information of the network;

receiving a message from one node linked to said computer commanding the computer to add a specified node to the network;

storing information identifying the a message;

forwarding the a message to other nodes linked to said computer;

receiving replies to the message from said other nodes;

collating the replies received from said other nodes with the stored information to generate a single reply, and dependent on the contents of said replies, adding the specified node to the information maintained by the node concerning the configuration of the network.

7. A computer workstation adapted to form a node in a network, said network consisting of a plurality of nodes linked together in a minimum spanning tree topology, the workstation comprising:

a structure which stores configuration information of the network;

means for receiving a message from a node linked to said computer commanding the computer to add a specified node to the network;

means for storing information identifying the message;

means for forwarding the message to other nodes linked to said computer;

means for receiving replies to the message from said other nodes; and means for collating the replies received from said other nodes with the stored information to generate a single reply, and dependent on the contents of said replies, adding the specified node to the information maintained by the node concerning the configuration of the network.

8. A computer workstation adapted to form a node in a network, said network consisting of a plurality of nodes linked together in a minimum spanning tree topology, the computer workstation comprising:

means for receiving a message from a first node linked to said computer workstation inquiring whether an identifier specified in said message is available for allocation to a new node to be joined to the network;

means for storing information identifying the message;

means for forwarding the message to other nodes linked to said computer;

means for receiving replies to the message from said other nodes;

means for collating the replies received from said other nodes with the stored information to generate a single reply, and dependent on the contents of said replies, indicating whether or not said identifier is available; and means for sending the single reply to said first node.

9. The method of claim 5 further including the step of sending the single node add reply to the one node.

10. The method of claim 6 further including the step of sending the single reply to the one node.

11. The computer workstation of claim 7 further including means for sending the single reply to the node.

* * * * *